United States Patent [19]

Rogers

[11] Patent Number: 4,805,895
[45] Date of Patent: Feb. 21, 1989

[54] IMAGE FORMING APPARATUS AND METHOD

[76] Inventor: Robert E. Rogers, 824 N. Victory, Burbank, Calif. 91502

[21] Appl. No.: 44,936

[22] Filed: May 1, 1987

[51] Int. Cl.$^4$ ............................................. A63J 5/02
[52] U.S. Cl. ....................................... 272/10; 272/8.5
[58] Field of Search ...................... 272/2, 3, 8 R, 8 M, 272/8 P, 8.5, 10, 11, 13, 16, 18, 21

[56] References Cited

U.S. PATENT DOCUMENTS

| | | | |
|---|---|---|---|
| 570,255 | 10/1896 | Kerner | 272/10 |
| 663,267 | 12/1900 | Fitch | 272/10 |
| 1,166,701 | 1/1916 | Mansfeld | 272/8 P X |
| 1,456,233 | 5/1923 | Hammond et al. | 272/8.5 |
| 1,775,237 | 9/1930 | Dawley et al. | 272/8.5 |
| 2,402,822 | 6/1946 | Kraft | 272/10 X |
| 2,861,806 | 11/1958 | Disney | 272/18 |

FOREIGN PATENT DOCUMENTS 2323422  4/1977  France ................................. 272/10

Primary Examiner—David A. Scherbel
Assistant Examiner—Richard E. Chilcot, Jr.
Attorney, Agent, or Firm—Nemschoff & Supnik

[57] ABSTRACT

A theatrical imaging system for forming images where there are no image forming surfaces includes a theater having a raked audience viewing are in spaced apart relationship in front a stage. A false ceiling separates a motion picture projector and rear view projection screen, from the audience viewing area. The screen disposed above and in front of the audience provides a real image forming surface. A semi transmissive reflecting member disposed at an angle of 13½ to 31 degrees to a vertical plane disposed normal to the average sight line of the audience member is disposed in facing relationship to the screen to generate a virtual image on the stage in the line of sight of the audience.

17 Claims, 4 Drawing Sheets

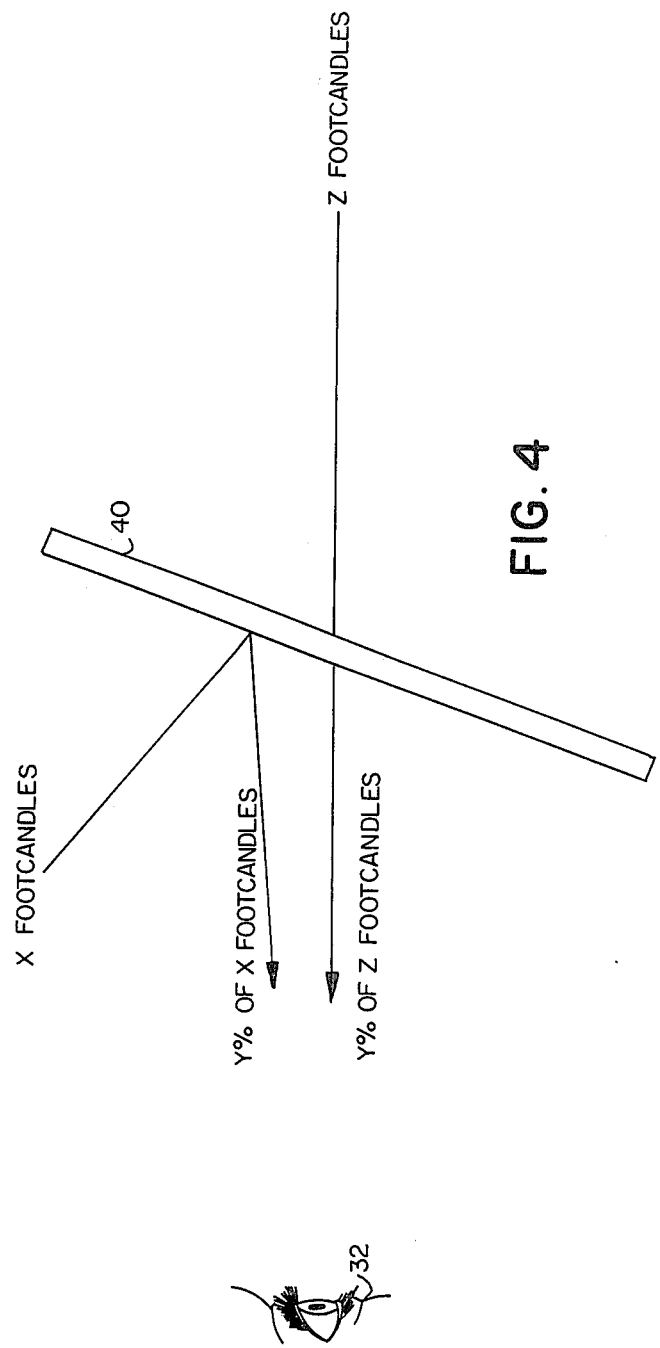

IMAGE FORMING APPARATUS AND METHOD

FIELD OF THE INVENTION

This invention pertains to apparatus and methods for creating visual images suspended in space without a screen. More particularly, this invention pertains to theatrical audience presentation systems.

BACKGROUND OF THE INVENTION

The purpose of the present invention is to create before a theater audience of significant size, the effect of ethereal images formed in space where there is no screen. Previous attempts to form images in space fall primarily into these categories:

a. Projections onto gauze or other transparent surfaces

Projections onto solid-but-nearly-invisible elements such as suspended gauze or glass create an apparent effect similar to that of the present invention, but not the actual result of it.

However, disadvantages of these methods have included (a) the fact that other solid objects such as performers can not occupy the same space as the image forming surface, (b) it is difficult to hide the edges of the image forming medium and (c) the projected image will penetrate the image forming medium and continue on to spill its light elsewhere, distracting from and spoiling the effect.

b. Projections on live smoke

Early attempts included lantern projections which focused images onto real smoke. The descendant of this approach can be seen today in light shows which use programmed lasers or other high intensity light sources to create images or shapes in smoke. Smoke projections fall into two categories:

(i) Light shades projected through a smoke filled room. By this method, room is filled with thin smoke, enough to deflect light, but not enough to stop it. Thus a path of light appears as a translucent column or shaft with three dimensional shape. This method has the disadvantage of filling the observation area with smoke which contaminates the air being breathed by the observer.

(ii) Images projected onto surfaces of dense smoke. By this method, images are projected onto the exterior surfaces of dense smoke. The smoke is dense enough to substantially absorb the light entering it and thus its exterior becomes an image-forming surface on which can be focused images from transparencies or video projection systems or programmed images drawn by lasers. A specific example of the latter is an exterior night laser show which draws pictures and writes words on natural clouds in the night sky. Such a system was part of the Federal Express exhibit at the Knoxville World's Fair in 1982.

The principal disadvantage of this method is the unreliability of the image forming medium. Weather patterns and even subtle interior wind currents can displace or disburse the smoke or other medium being used as the image forming surface, thus causing the effect to fail.

c. Three dimensional film technique

Three-dimensional film techniques can be used to form images in space where there is no screen. These methods are well documented. By these techniques, a solid projection screen appears as a window and projected objects appear to float away from that window, either in "negative space" (between the observer and the screen) or in positive space (on the other side of the screen from the observer) thus forming images where there is no image forming surface.

However, using these methods, combining the images with solid objects such as props, sets and actors, is impossible because (a) the solid objects interfere with the projection of the three-dimensional effects and (b) the nature of the stereo imaging process causes observers in different parts of the observation area to see the images in slightly different places. Since the location of the image is therefore not constant when observed by more than one person, it therefore follows that the images cannot be dependably aligned with solid objects which may be part of the presentation or demonstration.

d. BLUE ROOM TECHNIQUES

By the Blue Room Technique percentage mirrors, that is mirrors which are partially silvered so that they are capable of both transmitting and reflecting light, are placed in a vertical or 45 degree plane between the audience and the area to be observed, thus, the stage set. Real objects are hidden off stage or above or below the audience. By reflection, the virtual image of these objects appears to be in the set with objects or actors.

Based on the placement of the glass, the basic Blue Room techniques can be classified in three basic configurations. In two cases the percentage mirror is 90 degrees to grade. In the third case, it is 45 degrees to grade.

1. BLUE ROOM TYPE 1

Traditional Blue Room

Here the percentage mirror is disposed in a vertical plane, but at 45 degrees to a plane normal to the axis of a central observer's line of sight to the stage. The real object is placed in the wings of the theatre, hidden from direct view by the theatre proscenium, positioned so that by reflection in the percentage mirror, its virtual image appears to be on stage, aligned with props and sets.

In the Traditional Blue Room, the virtual images appear on the same level with the audience.

The inherent disadvantages of this system are:

(a) The percentage mirror is overly expensive because it is huge, its width averaging approximately $2\frac{1}{2} \times$ the width of the virtual image. For example, an audience 15 seats wide by 11 rows deep requires a percentage mirror 7.7 meters wide to achieve a virtual image merely 3 meters wide. In this arrangement, width is significant measurement as changes in height do not alter the relationship of any other elements of the arrangement. A change in width, however, has implications on all other relationships in the arrangement.

(b) The viewing distance is long. The distance from the closest observer to the virtual image is over 5 times the width of the virtual image. For example, in the study audience of 15 people wide by 11 rows deep, observing a virtual image only 3 meters wide, the closest observer will be about 16 meters from the virtual image.

(c) The width of the virtual image is too restricted. This again is dependent on the size of the glass, but a rather large length of glass (7.7 meters) yields only 3 meter wide virtual image.

(d) The width of the stage is restricted by the masking member required to hide the real image from direct view. It requires more floor space than any other configuration because unlike any other configuration, the real object is in the wings of the theatre. This increases construction and land costs.

2. BLUE ROOM TYPE 2

Disney's Haunted Mansion Configuration

The configuration used in the "Ballroom" scene in Disney's Haunted Mansion in Disneyland and Walt Disney World, is a variation of the Blue Room. A very large percentage mirror is placed in a vertical plane, and at 90 degrees to a plane normal to the axis of a central observer's line of sight to the stage.

The real objects are placed either above or below the audience area, hidden from direct view by the floor or ceiling of the balcony where the audience is located. The objects are positioned so that, by reflection, they appear to be on stage, aligned with props and sets. The Haunted Mansion configuration causes the virtual images to appear in the stage area both above and below the level of the audience.

The inherent disadvantages of this method are that:

(a) it is impossible to make a virtual image appear on the same level with the audience;

(b) the viewing angles are awkward and become physically uncomfortable for presentations longer than one or two minutes;

(c) audience depth is limited to a few rows at most. This is because the geometry of the sight lines, especially those to the lower virtual images, require an audience rake that sweeps upward, becoming severe after only a few rows. It is further limited by being sandwiched between the balcony ceiling and floor, both of which are necessary in order to mask the direct view of the real objects;

(d) the percentage mirror is huge, almost three stories tall, quite beyond the normal limits on commercially available glass. Its cost is extravagant and it is subject to availability problems. In this configuration the height is the key dimension. Changes in width do not alter the relationship of any other elements in the arrangement. A change in height, however, has implications on all other relationships in the arrangement;

(e) the theatre architecture is a large volume in a highly unusual configuration. It is extremely tall, but not too deep. The large volume and unusual shape makes it expensive to construct. It would be extremely difficult to find an existing structure into which system could be adopted.

3. BLUE ROOM TYPE 3

Sideways Blue Room

This is similar to the Traditional Blue Room, except that the entire apparatus is rotated 90 degrees around the axis of the central observer's line of sight. Although this is theoretically possible, it is architecturally awkward, expensive and optically inferior when used in a theatrical scale, thus, where the virtual image is 4 feet (1.2 meters) or taller.

The result is that the percentage mirror is now in a plane 45 degrees with respect to the vertical, but is base remains normal to the central observer's sight line. The real object is either directly above or directly below the percentage mirror. If the bottom edge of the percentage mirror is closest to the audience, then the real image will be directly above the mirror, hidden from direct view by the proscenium of the stage.

If the top edge of the percentage mirror is closest to the audience, then the real image is directly below the mirror, hidden from direct view by the portion of the stage floor closest to the audience. Like the Traditional Blue Room configuration, the Sideways Blue Room allows for a virtual image on the same level with the audience.

The inherent disadvantages of this system are:

(a) The percentage mirror is costly, it being significantly taller than the virtual image. For example, for an audience 15 seats wide and 11 rows deep, a virtual image 3 meters wide requires a percentage mirror 3.8 meters tall. Height is the significant dimension in this configuration.

(b) The theatre architecture is unusual and very expensive to build if a film or video projection is used to generate the real image. Either film or video imagery would require a large vertical projection cone either above or below the stage and an accompanying service access stairway, both of which would be extremely expensive to construct.

(c) Distortion and displacement will be maximized due to the natural sag of the percentage mirror. Whenever large sheets of glass are placed at angles of more than 25 to 35 degrees with respect to vertical, gravity causes them to sag significantly. Thus the virtual image will be distorted and displaced. Observers in different parts of the audience will "see" the virtual image in slightly different places and thus it is impossible to accurately align the virtual image with the sets, props and actors on stage for accurate viewing by the entire audience.

SUMMARY OF THE INVENTION

A system is provided for displaying a multi-media image to an audience at a location where there is no image forming surface. A partially transmissive reflecting member is disposed in facing relationship to a real image forming surface to create a virtual image in front of the reflecting member, substantially directly in front and in the viewing line of sight of a theater audience. The reflecting member is positioned at an acute angle to a vertical plane in front of the line of sight of the viewing audience.

In a more specific example, the reflecting member is position at an angle of between 13½ and 31 degrees to the vertical plane in front of the line of sight of the viewing audience. The real image forming surface is placed at an angle between 5° and 38° with respect a vertical plane. The real image generating source is a rear view projection screen, and the masking member is a false ceiling disposed above the audience viewing region.

BRIEF DESCRIPTION OF THE DRAWINGS

The nature of the invention described herein may be best understood and appreciated by the following description taken in connection with the accompanying drawings in which:

FIG. 4 is a diagrammatic perspective view of a reflecting member in accordance with this invention.

DETAILED DESCRIPTION

Figure 1:
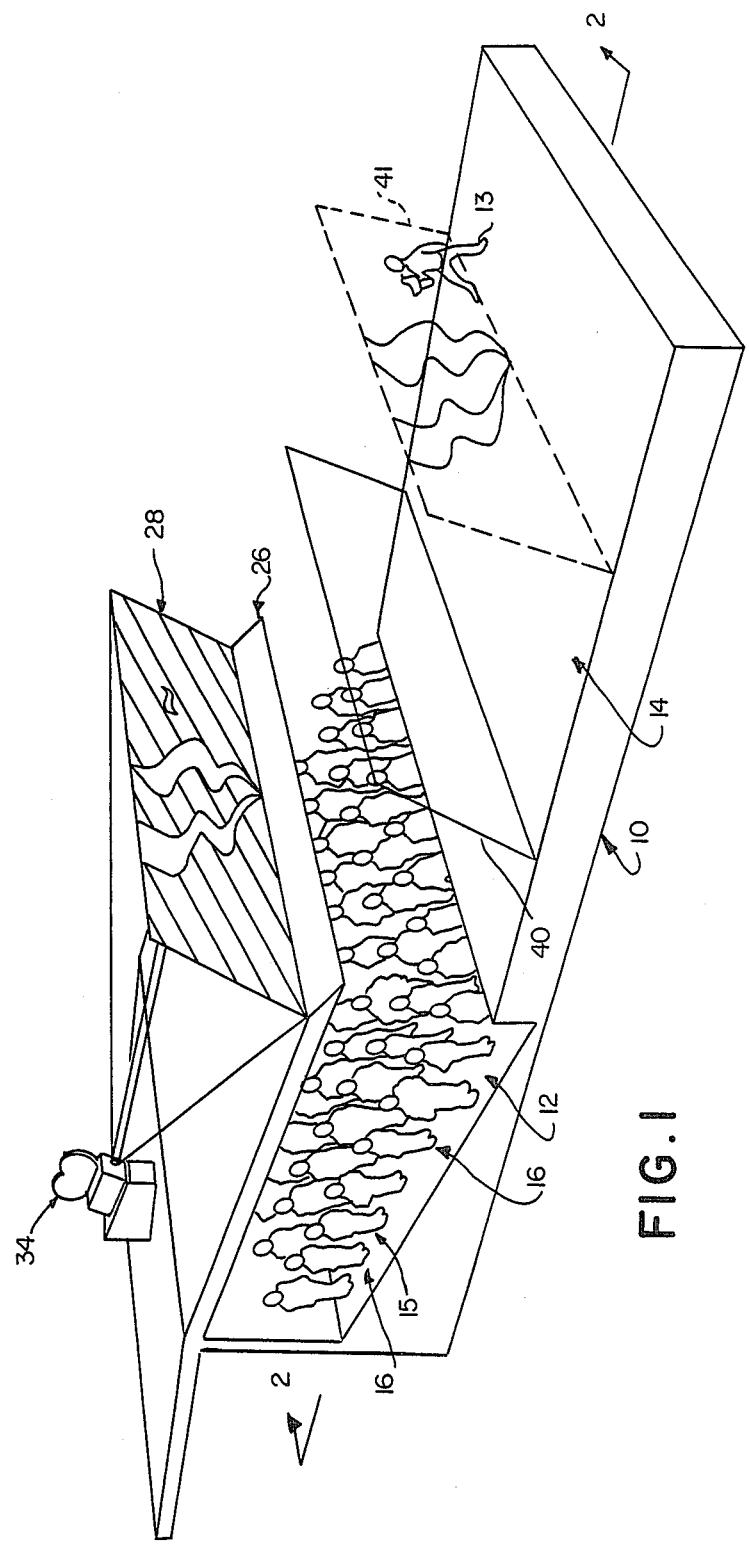
FIG. 1 is a diagrammatic perspective view of a presentation system in accordance with this invention.

An example is given of a system for displaying a multi-media image to an audience, where there is no image forming surface. The effect achieved by this invention is to provide an image forming apparatus which is low in cost in architectural and technical construction, in view of the size of glass used, yet provides visual effects not otherwise economically reasonable to duplicate. The audience is kept in close range to the virtual image, yet is not required to view the presentation at awkward angles.

With reference to FIGS. 1, 2, 3 and 4, apparatus for generating images in accordance with this invention generally comprises a theater 10 having an audience envelope 12 and a stage region 14. The objective the of invention is to give the observer in the audience envelope 12 the vivid effect of combining transparent ethereal images such as smoke or solid images, with real objects 13 such as props, smoke and actors all appearing to be in the stage region 14.

Audience Envelope

The audience envelope 12 comprises a plurality of rows 16 of seats 18 or other means for the audience to sit or stand. The audience envelope 12 has a depth "D" extending from about the last row 20 to about the first row 22. The difference in height of adjacent rows 16 determines the rake (.R) of the audience envelope 12. To allow further observers 30 to see past those closer observers 32, a rake of between 7 degrees and 25 degrees is suggested for the audience envelope.

The width of the audience envelope 12 is not significant. The depth of the viewing envelope, that is, the distance from the closest observer 32 to the furthest observer 30 is greater than about 4 meters. The depth should be not greater than about 20 meters, thus 30 meters from the vertical image, to be able to view the full height of the virtual image. An ideal audience depth is about 10 meters. Typically, this means 10 rows of viewing.

Viewing distances vary as the depth of the audience envelope varies. Thus, if the audience envelope is 7.5 meters deep, then the ideal viewing distances would be as follows:
Closest: 10.5 meters
Average: 14 meters
Furthest: 17.5 meters If on the other hand the audience envelope is 11 meters, the viewing distances would be:
Closest: 11.5 meters
Average: 17 meters
Furthest: 22.5 meters The ideal height for the virtual image is 3.0 meters. It can be as tall as 8 meters or as short as ½ meter. The width is not a significant aspect of the invention.

An ideal virtual image height for an audience depth of 7.5 meters is 2.9 meters. An audience depth of 11 meters will require a reflecting member approximately 3.2 meters tall. Width is unimportant except to the extent that the observers must have clear sight lines.

Real Image Projection

Disposed above the audience envelope 12 is a masking surface 26. The masking surface 26 is a false ceiling which prevents the members of the audience from viewing apparatus and the real image 28 above the masking surface 26.

A rear view projection screen 28 is disposed above and toward the front of the audience envelope 12. The masking surface 26 is a false ceiling placed between a real image screen 28 and the audience envelope 12. The purpose of the masking surface 26 is to prevent the audience from being aware of the projection. The audience includes various observers including a far observer 30, an average observer 31 and a near observer 32. The observers 30, 31 and 32 establishes sight lines to the stage 14. These include an upper sight line 50 from the furthest observer 30, to the top of the virtual image, limited by the masking surface 26. The lower sightline 52 is established by the closest observer 32, extending to the bottom of the virtual image. A central sightline 54 of an average observer 31 extends directly to the center of the virtual image. The masking surface 26 intervenes between the observers 30, 31, 32 and the real image created at the real image screen 28 without interfering with any sightlines, as this would obstruct the view of the virtual image.

Stage Region

The stage region 14 has an apron 33 adjacent the audience envelope 12. By leaning forward over the apron 33 of the stage region 14, some of the close observers 32 may attempt to look around the masking surface 26 to see the real image on the rear view projection screen 28. To prevent this, the mask surface 26 must extend over the stage region 14 so as to block the view of the real image on the screen 28 from the areas within 1 meter of the edge of the stage region 14, again, without interfering with the sight lines.

In determining the parameters of the apparatus, the impressions of a tall far observer 30 and a short close observer 32 should be examined in determining the extreme sight lines. A far observer 30 is indicated at the last row of the audience envelope 12 and a short close observer 32 is indicated at the front row of the audience envelope 12.

Above the masking surface 26 is disposed a projector 34 for generating an image and a rear view projection screen 28 for providing a real image. The screen 28 is disposed at an angle of between about 5° and 38° to a vertical plane 29 perpendicular to a sight line of the audience as defined by the observers 30, 31, 32. The rear projection screen 28 is also disposed toward the projector 34 and receded from a front edge 38 of the masking surface 26 so that the line of sight of a close observer 32 is prevented from looking upward and seeing the projection screen 36. The angle of the projector is limited within 25° of being level, avoiding the necessity of special cooling equipment for ordinary projectors for 35 mm and 70 mm motion pictures. Limited floor space is required for the overall system, since the projector 34, and screen 28 on which the real image is projected are tucked into a loft above a false ceiling rather than attached to the side of the theatre 10.

The real image on the rear view projection screen 28 must be hidden above and usually in front of the closest observer 32. For most audience sizes, the ideal range works out to between 3.1 meters and 8.9 meters above the floor 35 at the closest audience approach, that is the position of a closest observer 32. In depth, the real image screen 28 will usually fall within 3.5 meters in front of or behind the point of closest audience approach.

The angle of the rear view projection screen 28 is ideally 20 degrees from a vertical plane, yielding a virtual image angled at 20 degrees when the reflecting member 40 is at 20 degrees. The rear view projection screen 28 should be no less than 5 degrees and no more than 38 degrees from vertical.

The rear view projection screen 28 is a translucent surface. It is usually flat, but may be shaped and sculptured to achieve an effect. When especially photographed and edited motion picture images are projected onto the rear surface 27, that is the side away from the reflecting member 40, they are visible from the front side 29, that is the side toward the reflecting member 40. In a visual presentation, this can create the illusion of movement, life and metamorphosis.

Reflecting Member

Figure 2:
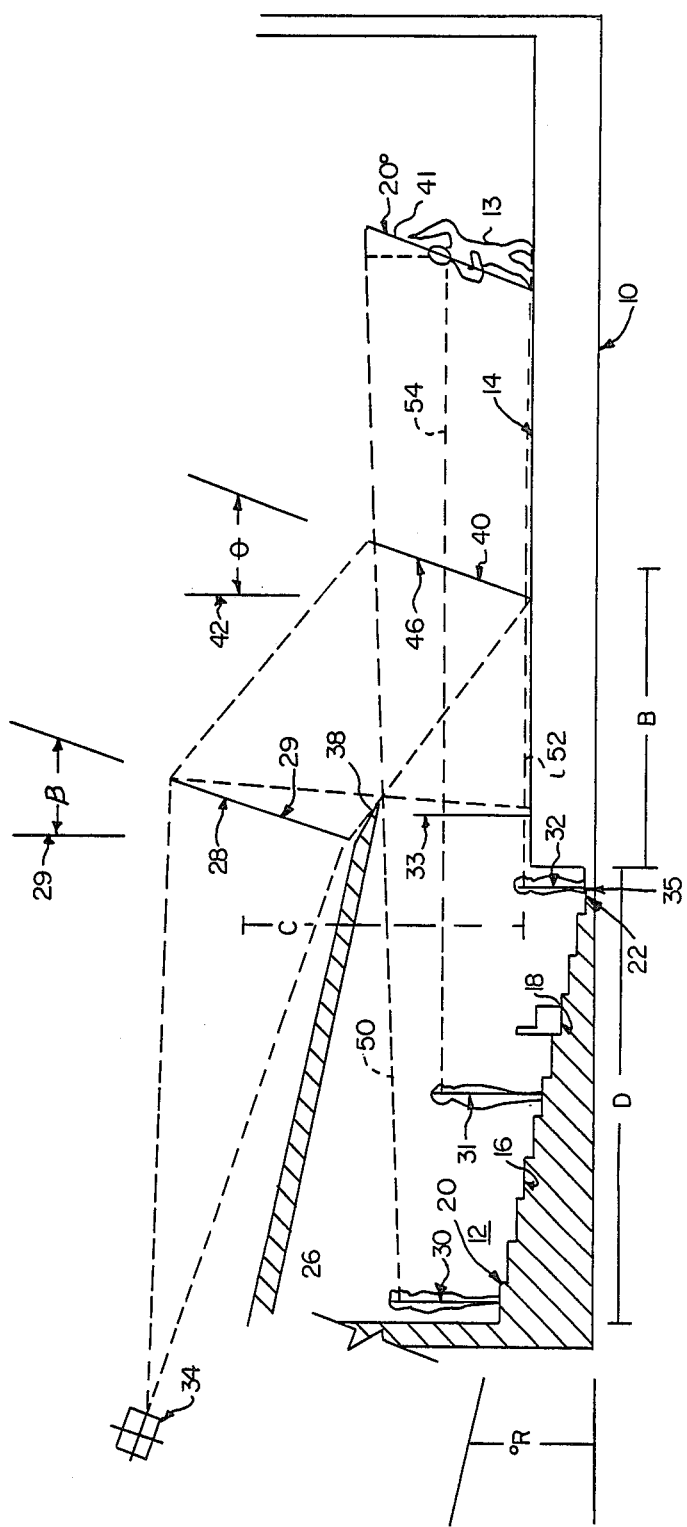
FIG. 2 is a diagrammatic elevational view taken along lines 2—2 of FIG. 1.
Figure 3:
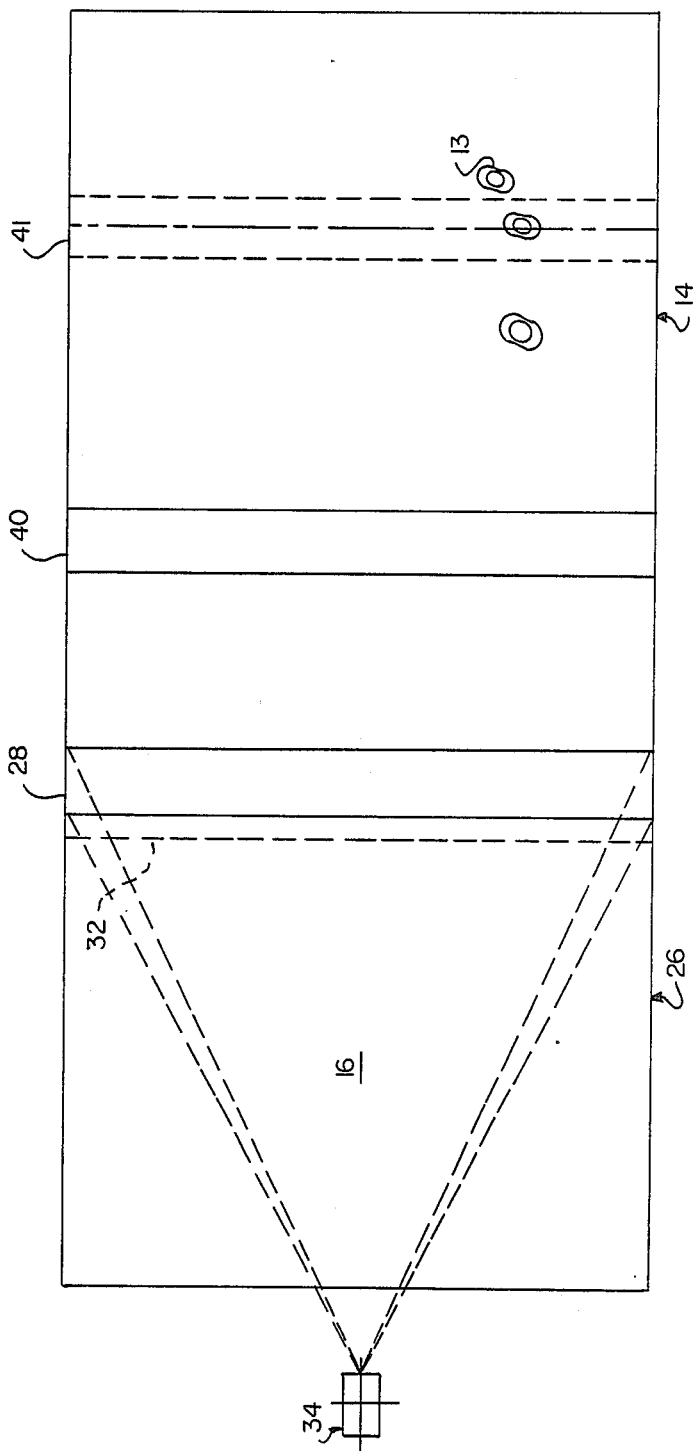
FIG. 3 is a diagrammatic plan view of the invention depicted in FIG. 1.

Set in the line of sight of the close observer 32 and the far observer 30, is a reflecting member 40. The reflecting member 40 is composed preferably of semi reflective and semi transmissive glass, so that it will both reflect and transmit light as shown in the diagram of FIG. 2. The reflecting member 40 is disposed at an acute angle to the vertical plane 42 normal to a line of sight of the average central observer and the far observer. The angle is between 13½ degrees and 31 degrees from the vertical plane. Audience row depths of about 4 allow the smaller degree of angle, while greater audience row depths require greater angles of tilt. The combination of the rear view projection screen 28 and the reflecting member 40 locates a virtual image appearing to the audience to be disposed beyond the reflecting member 40. The real objects 13 such as props, sets and actors are disposed behind the reflecting member 40 and are viewed by the audience 15. Placement of the virtual image is established by principles mirror symmetry of of the reflecting member 40. The ideal height for the virtual image is 3.0 meters. It can be as tall as 8 meters or as short as ½ meter. The width is not a significant aspect of the invention.

While there is theoretically no limit on the furthest distance from the farthest observer, the closest viewing distance will preferably be between 3 and 5 times the height of the virtual image.

When placed at the preferred angle, the reflecting member 40 must cover the viewing window. The sightline from the tallest and furthest observers to the top of the virtual image defines the upward limit of the viewing window. The sightline from the lowest/closest observer to the bottom of the virtual image defines the lower limit.

The center 46 of the reflecting member 40 should ideally be 5.1 meters from the point of closest audience approach. It should be at least 4.0 meters and no more than 8 meters. The angle of the reflecting member 40 should ideally be 21 degrees with respect to the vertical, but in no case should it be less than 13½ degrees or more than 31 degrees from a vertical plane normal to a central sight line of an observer. For an audience envelope depth of 10 rows the angle of the reflecting member can be as little as 18 or 19 degrees though this tends to partly mask the view from the back row, as it intrudes on the upper sideline. If the angle is 13½ degrees, the theater audience 12 tends to be limited to about 4 rows of people without partly masking the view of the upper sightline of the virtual image.

The reflecting member 40 is preferably glass having a surface treatment applied or manufactured into the reflecting member so that the reflection loss is equal to the penetration loss, as indicated in FIG. 2. That is, light is reflected from its front surface 48, the front being the side towards the audience, with the same efficiency as which it transmits light from back to front.

Ideally, neither source loses more than three "f-stops" of light. Presently reflecting materials are available which will approximately maintain equality of reflection and transmission, within 1 f-stop.

Another objective of the present invention is to use the smallest piece of glass possible. The cost of surface treated tempered glass is substantial. The thicker and larger the glass, the greater the cost. The glass must be of sufficient quality so that the image viewed remains undistorted and does not give an "unrealistic" impression to the viewing audience. One problem associated with glass is the sag that occurs if the glass is placed at an angle to the vertical which significant increases as the angle from the vertical increases. Sagging glass causes distortion and displacement of the virtual image. Another problem which presently exists is the current availability of glass which is larger than 8 feet (2.4 meters) by 8 feet (2.4 meters). Larger glass becomes difficult to find, buy, transport, install and treat and thus, significantly increases the cost. The use of progressively larger sheets of glass would significantly increase the cost, and replacability of that type of glass for a reflecting member. While separate sheets of glass could be contiguously joined, the mullions separating the sheets of glass, or even a line separating sheets of glass, if structurally possible, could significantly destroy the visual imagery sought on the audience which is sought to be created by this invention.

The real image is reflected in the reflecting member and thus its virtual image appears to be on stage with the actor 13. A robot or other dimensional items may be substituted for the actor.

From the actor's position, the virtual image is not visible and so the actor's movements must be coordinated by memory with the animation in the virtual image. The actor listens to a sound track synchronized with the film projector and times the actors movements like a dancer. Coordination is achieved by computer programming when robots or other dimensional effects are used on stage.

Once an observation area or audience envelope and placement of a virtual image is defined, the objective is to establish a preferred arrangement for the glass, allowing to minimize the size of glass and bring the virtual image as close to the audience as possible.

The parameters that can be varied include the number of rows of the audience, thus defining the audience depth, the rake of the audience to determine how far above the person in front, must the person sitting in the back row be able to see. This is also related to the spacing of the people or rows from one another and their placement with respect to the stage area they must see.

Once these factors are defined, then there is a preferred arrangement to make appearing real the images for people in front row and make to make the virtual image as close to them as possible.

Operation

In operation, a motion picture is photographed on a strip of film, developed and projected onto the rear view projection screen 28. Alternatively, a video image is photographed and projected onto the projection screen 28. The projection screen 28 is positioned above or below the audience envelope 12 at an angle of between 5 degrees and 38 degrees with respect to the vertical. The reflecting member 40 is oriented in front of the audience envelope at an angle between 13½ degrees and 31 degrees with respect to the vertical plane. This arrangement results in the creation of virtual images formed in space appearing to be in front of the reflecting member where there is no image forming surface.

Unlike Blue Room situations such as the Haunted Mansion configuration, unusually expensive architectural structures are not required. All that is necessary is that there be a masking member disposed above the audience, and a projection system above or above and behind the masking member. The viewing angles are far more comfortable in prolonged presentations. Audience depth is not as limited. For example, the Haunted Mansion configuration is straining if more than three rows are attempted, while the present invention can accept 20 or more rows. A smaller reflecting member is required, saving significant costs, on specially surfaced material. The projector need not be disposed at great angles to the horizontal since the real image is generated on the rear view projection screen 28 at a small acute angle. For larger projectors 34, such as 35 mm or 70 mm projectors, this reduces the necessity for special equipment for cooling the projectors 34.

Some systems, previously used allowed for very shallow audiences and required that to allow a larger audience, very wide viewing rooms were required, or it was necessary to move the audience quickly into and out of the room. However, this invention allows an audience depth rather significant, yet still allows the audience to be relatively close to the virtual image. Moreover, both the close observer 32 and the far observer 30 can view the virtual image in a relatively straight line without viewing the images at uncomfortable angles.

Unlike the prior system, here, the reflecting member is placed at a small acute angle with respect to the vertical. The virtual image then appears on the same level as the audience, while the real image can be either over or under the audience.

The present invention accommodates a significant audience in a conventionally shaped theater. The architecture and land use are efficient. This kind of show is desirable in locations such as theme parks, shopping centers, world fairs and other venues where land is at a premium. Given equal sized audiences of 165, the area required for theatre construction including the audience area, stage platform and upstage area allowing at least 3½ meters from the virtual image to the rear wall of the stage are as follows:

|  | AUDIENCE | OVERALL DIMENSIONS (meters) | LAND (sq. meters) | VOLUME (cu. meters) |
| --- | --- | --- | --- | --- |
| PRESENT INVENTION | 11 rows of 15 people | 9.5 × 21.2 × 7.4 | 201.4 | 1490 |
| TRADITIONAL BLUE ROOM | 11 rows of 15 people | 9.5 × 29.7 × 4.5 plus projection wing 4.5 × 16.0 × 4.5 | 354.2 | 1593.7 |
| SIDEWAYS | 11 rows of 15 people | 9.5 × 19.2 × 4.5 plus projection shaft and stairway 4 × 8 × 11 | 214.4 | 1173 |
| HAUNTED MANSION | 3 rows of 50 people | 27 × 20 × 15 | 540 | 8100 |

From the above table, the present invention can be seen as the most efficient except as against the total volume required Sideways Blue Room. In the latter case, the unconventional shape caused by the projection shaft makes the building cost prohibitive to build.

The system allows a significant audience depth, one equal to or greater than any of the three Blue Room Configurations, yet it still allows the audience to be relatively close to the virtual image. While the Haunted Mansion configuration allows a similar proximity, it does not allow nearly so deep an audience. The Traditional Blue Room allows the same audience, but forces the virtual image into a more narrow configuration considerably farther away. The Sideways Blue Room configuration can match the combination only with dramatically increased construction costs and increased costs for the larger reflecting member, which results in increased distortion and displacement of the virtual image.

Cost efficiency of the reflecting member is a factor in the overall construction costs. A 3 meter by 2 meter sheet of high quality treated glass may cost $10,000 or more. As the glass size increases, the cost per square foot rises rapidly making larger glass panels general not economically feasible. The following table shows a comparison of glass dimensional sizes (in meters) required for a given virtual image (also in meters).

|  | Reflecting | Virtual | Ratio |
| --- | --- | --- | --- |
| PRESENT INVENTION | 2.9 | 3.0 tall | 0.967 |
| TRADITIONAL BLUE ROOM | 7.7 wide for | 3.0 wide | 2.57 |
| SIDEWAYS | 3.8 tall for | 3.0 tall | 1.27 |
| HAUNTED | (limited to about 4 rows deep.) | | |

The Haunted Mansion features a virtual image in two segments, upper and lower, so it does not directly compare. Adding the two segments together would give an efficiency ratio of about 2.4.

Thus, imaging apparatus and process has been described which provides improved viewing by an audience by placement of the virtual image closer to the audience. The size of the reflecting member is minimized, thus lowering costs. The cost of the theater construction is kept low, since the systems can fit into readily available architectural spaces for equivalent size audiences. This has been achieved, since the theater requires less height than the Disney Haunted Mansion configuration, and less depth than traditional blue room. This gives an efficient combination of construction and land use, audience depth and viewing proximity, and allows cheap, cost effective use of the reflecting member.

While the invention has been shown and described with respect to specific forms thereof, it will be understood that changes and modifications may be made in accordance with the spirit and scope of the invention.

What is claimed is:

1. Apparatus for displaying a multi-media image to an audience comprising:
   an image projection source for projecting an image to an image forming surface;
   real image forming surface means for providing an image to be reflected to create a virtual image to be viewed by and in front of an audience region, the real image forming surface means disposed in spaced apart relationship in front of the image projection source;
   means for masking the real image forming surface means from the audience;
   a stage region;
   an audience envelope defining a region in which a significant number of individuals may be gathered as an audience for simultaneous viewing the stage region, the stage region defining regions for viewing by a far observer, a close observer and an average observer, the close observer, far observer and average observer viewing regions defining central level sightlines and limit sightlines for the stage region; and
   a first partially transmissive reflecting member for creating a virtual image in front of the real image forming surface, the reflecting member means disposed in front and in spaced apart relationship to the real image forming surface, substantially directly in front of and substantially within the limit sight lines of the close observer, far observer and average observer viewing regions, the reflecting member disposed at an acute angle to a vertical plane in front of the line of sight of the viewing audience;
   whereby the central sightline to the virtual image of the average observer is substantially direct, the distance of the audience is relatively close to the virtual image, and the apparatus is housed in a theater of economially modest architectural and technical construction to minimize the reflecting member size and theatre size demands.

2. The invention as set forth in claim 1 and in which the reflecting member is disposed in a plane at an angle between 13½ degrees and 31 degrees to a plane normal to the central sight line of the average observer, the reflecting member defining a virtual image in a region substantially directly along the central level sightline of the average observer.

3. The invention as set forth in claim 2 and in which the audience envelope defines a front row for locating a close observer, the masking means disposed above the audience envelope and the real image forming means disposed above and adjacent the front row.

4. The invention as set forth in claim 2 and further comprising theatrical sets disposed in a region behind the reflecting member in the vicinity of the virtual image.

5. The invention as set forth in claim 3 and in which the reflecting member comprising a semi reflective glass panel having a thickness of ⅜ inch to ¾ inch, a size of about 3 meters tall and a reflectance efficiency approximate that of the transmissive efficiency.

6. The invention as set forth in claim 3 and in which the audience viewing region defines a box for seating in excess of 50 people disposed in at least 3 rows.

7. The invention as set forth in claim 5 and in which the projector comprises a motion projector for projection film of at least 35 mm format, and the projection angle is at a small acute angle to the horizontal.

8. The invention as set forth in claim 6 and in which the real image forming surface means comprises a flexible frosted plastic material.

9. The invention as set forth in claim 7 and in which the theatre comprises a viewing region having between 10 and 20 seats in width, a depth of 5 to 25 rows and the reflecting member is disposed at an angle of about 21 degrees.

10. Apparatus for displaying a multi-media image to an audience comprising:
    a theater having a theatrical viewing region defining an audience envelope and a stage region, the audience envelope having plural rows of audience viewing areas defining a close observer in the foremost row, a far observer in the furthest row and an average observer midway between the foremost and the far most rows;
    masking means for preventing the audience from observing an image projection system, the masking means disposed in facing relationship to a lateral plane, in spaced apart relationship to an audience viewing region;
    an image projection source for projecting an image to an image forming surface;
    real image forming surface means for providing an image to be reflected to the audience, the real image forming surface means disposed in advance of the image projection source above the masking surface means;
    a first partially transmissive reflecting member disposed in front of the real image forming surface to create a virtual image in front of the real image forming surface, substantially directly in front and in the viewing line of sight of the audience, the reflecting member disposed at an acute angle to a vertical plane in front of the line of sight of the viewing audience and in reflecting relationship to the real image forming surface means, the first partially transmissive reflecting member disposed at an angle of between about 13½ to 31 degrees to a plane normal to the line of sight of the audience viewing region; and
    real object means for providing real objects visually perceived by an audience in combination with a virtual image reflected by by the reflecting member, the real object means disposed in advance of the reflecting member, whereby the real image is viewed by an audience in the audeince envelope as a virtual image combined with the real object means along a direct line of sight behind the reflecting member.

11. The invention as set forth in claim 10 and in which the real image forming surface means is disposed above the masking surface means.

12. The invention as set forth in claim 10 and in which the real image is disposed at an angle of between 5 degrees and 38 degrees; and
    the virtual image is greater than 0.75 meters and less than 6 meters.

13. A process for forming visual images appearing to have transparency and suspended in space comprising the steps of:
   projecting a first image disposed in spaced relationship to an audience envelope, along a vertical plane, upon a frosted medium to generate a first real image;
   orienting the opaque medium at an acute angle to the vertical plane;
   positioning a partially transmissive reflecting means in advance of the opaque medium to partially reflect the first image, and positioning the reflecting means in advance of the audience envelope; and
   orienting the partially transmissive reflecting means about an angle of between about 13½ degrees to 31 degrees, from a vertical plane normal to a sightline of the audience envelope;
   whereby a virtual image is created in advance of the audience beyond the partially transmissive reflecting means, to create the illusion of an image before an audience having a depth of more than 4 rows, with commercially available glass, in a theater of reasonable architectural configuration.

14. The invention as set forth in claim 13 and in which the projection means and the opaque means is projected above the audience envelope.

15. The invention as set forth in claim 14 and in the virtual image is generated within a region of about ½ meter to 8 meters tall.

16. The invention as set forth in claim 14 and in which the opaque member is disposed at an angle of between about 5 degrees and 38 degrees to the vertical plane.

17. The invention as set forth in claim 14 and in which the reflecting member is disposed in a theater having a first row viewing row means and more remotely disposed viewing means spaced further apart from the reflecting member, and the step of orienting the reflecting member includes the step of orienting the distance of the reflecting member to the closest observer in the closest row a distance of more than 3 and less than 5 times the height of the virtual image, more than 4 meters and less than 8 meters.

* * * * *